United States Patent
Potts

(10) Patent No.: US 7,627,859 B2
(45) Date of Patent: Dec. 1, 2009

(54) METHOD FOR CONFIGURING NON-SCRIPT LANGUAGE LIBRARY FILES TO BE RUN AS SCRIPTS

(75) Inventor: Matthew P. Potts, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 11/098,301

(22) Filed: Apr. 4, 2005

(65) Prior Publication Data
US 2006/0225063 A1 Oct. 5, 2006

(51) Int. Cl.
*G06F 9/44* (2006.01)
(52) U.S. Cl. .................... 717/126; 717/106; 717/115
(58) Field of Classification Search .............. 717/9, 717/1, 114, 121, 124, 126, 136, 162
See application file for complete search history.

(56) References Cited

U.S. PATENT DOCUMENTS

| | | | | |
|---|---|---|---|---|
| 5,774,725 A | * | 6/1998 | Yadav et al. | 717/135 |
| 6,298,481 B1 | * | 10/2001 | Kosaka et al. | 717/110 |
| 6,694,509 B1 | * | 2/2004 | Stoval et al. | 717/124 |
| 2001/0037497 A1 | * | 11/2001 | Kumon | 717/9 |

OTHER PUBLICATIONS

Tom Christiansen, FMTEYEWTK about Compilation vs Interpretation in Perl, Jun. 1, 1996.*

* cited by examiner

*Primary Examiner*—Tuan Q Dam
*Assistant Examiner*—Hanh T Bui

(57) ABSTRACT

The preferred embodiment of the present invention comprises writing a script to perform a function defined in a subroutine in a library file, which is written in such a way that code that actually runs the subroutine is hidden in the file and is conditionally available to run the subroutine. Running the subroutine enables one to determine if it functions as expected.

10 Claims, 1 Drawing Sheet

METHOD FOR CONFIGURING NON-SCRIPT LANGUAGE LIBRARY FILES TO BE RUN AS SCRIPTS

BACKGROUND OF THE INVENTION

The present invention generally relates to the useful art of computer software programming.

Many software programs have been developed for use in commerce and other applications throughout the world that have been coded in the C programming language. Programs written in the C language must then be compiled to create a file that a digital computing means, such as a computer, can execute. In contrast to the above, a program written in a script language, such as PERL for example, can be executed directly, i.e., it does not have to be compiled. The script language itself will parse (search) the file, and execute it line by line.

The C language program is compiled into the native language of the computer it is running on, and often runs faster because of that. While it may run faster, it is not normally possible to directly change the executable file. While this is often considered to be desirable, there are advantages and disadvantages associated with programs written in a script language as well as those that must be compiled.

A library in C or other language generally comprises one or more files where each file has a single subroutine or function that can be used by any programmer that has access to and calls (pulls) the file. The main program can call the individual files that are needed to carry out its operation.

When writing C code as well as many other languages, it is common that a subroutine that is created can be useful in more than one program. The subroutine is often placed in a particular library file which can be called whenever one of the programs needs it. There is an advantage of having such a library file in that it is in a single location so that if it has to be changed, it only has to be changed at that single location.

A problem can arise if a script subroutine is used in many different scripts of many applications, for example., and a significant change is subsequently required in the subroutine. If that happens, it would be necessary to run all of the scripts that used that subroutine to test and make sure that it still worked in all of the various scripts.

Also, a script may have been written to do a specific operation or function, which was later determined to be useful in performing other operations in other programs. One way to use such a script is to remove the subroutine from the script and put it in a library file and then the script merely calls the library file having the subroutine.

If multiple programmers are working together on some project, one person might create a library, i.e., a subroutine, to perform a function, while another person writes the main program. The library creating person usually writes a script or a program as a "wrapper" around the library file to make sure the library file works. For example, if a subroutine that takes 2 input numbers and returns the product of the two, a library file can be written to do this, but the library file itself does not do anything except provide the subroutine. It is necessary to write another script to call the subroutine, input two numbers and check the result to determine if the subroutine worked. That is referred to as a wrapper or dummy script because its only purpose is to test whether the library file works.

It is inconvenient and time consuming to test a library script file in every application that it may be used.

SUMMARY OF THE INVENTION

The preferred embodiment of the present invention comprises writing a script to perform a function defined in a subroutine in a library file, which is written in such a way that code that actually runs the subroutine is hidden in the file and is conditionally available to run the subroutine to determine if it functions as expected.

DETAILED DESCRIPTION OF THE PREFERRED EMBODIMENT

The preferred embodiment of the present invention comprises writing a script to perform a function, and creating a library file for the function, but which is written in such a way that the code that actually runs the subroutine is hidden in the library file. In this regard, the term hidden is meant that it is not part of the subroutine of the file, but is not run except under certain predetermined conditions. If one were to examine the file, one would find the hidden code in the file. As known to one of ordinary skill in the art, as with any computer file, the library file is stored on a computer-readable medium such that it is capable of being executed by a computer.

Figure 1:
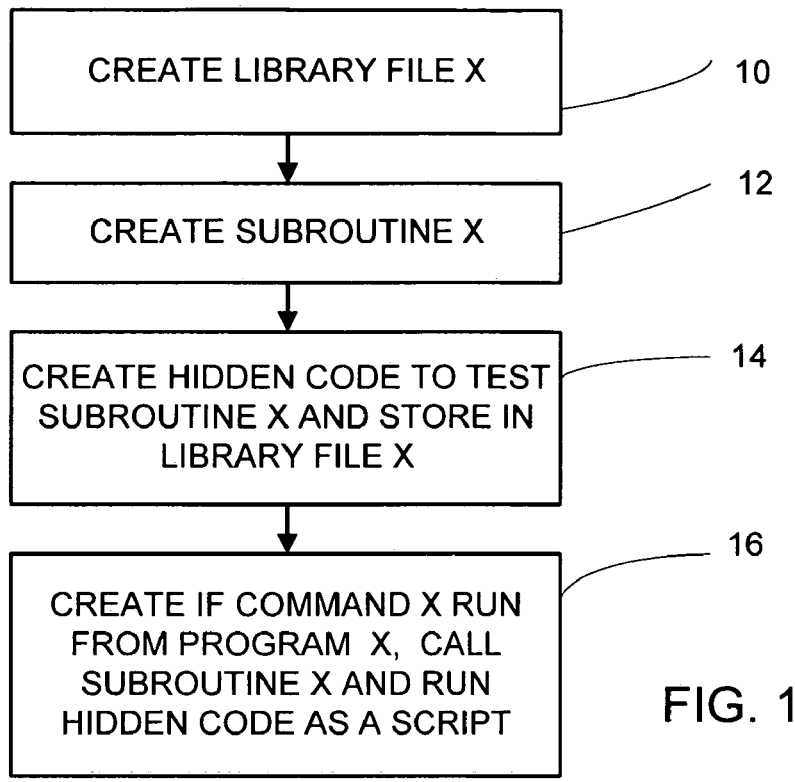
FIG. 1 is a flowchart illustrating the steps that are taken to create a library file according to an operation of the preferred embodiment of the method.

Most programming languages have a construct that lets one know what the file name is, and/or what the program name was that was run. That is used to advantage in implementing the preferred embodiment. Referring to FIG. 1, a library file X is created (block 10) in which a subroutine X is created (block 12). Also, code necessary to test the operability of the subroutine is created and is hidden in the library file X (block 14). Code is then written to determine if the command X is run from program X, the subroutine X is called and the hidden code is run as a script (block 16) for various reasons, including for example, to test the operability of the subroutine X.

Figure 2:
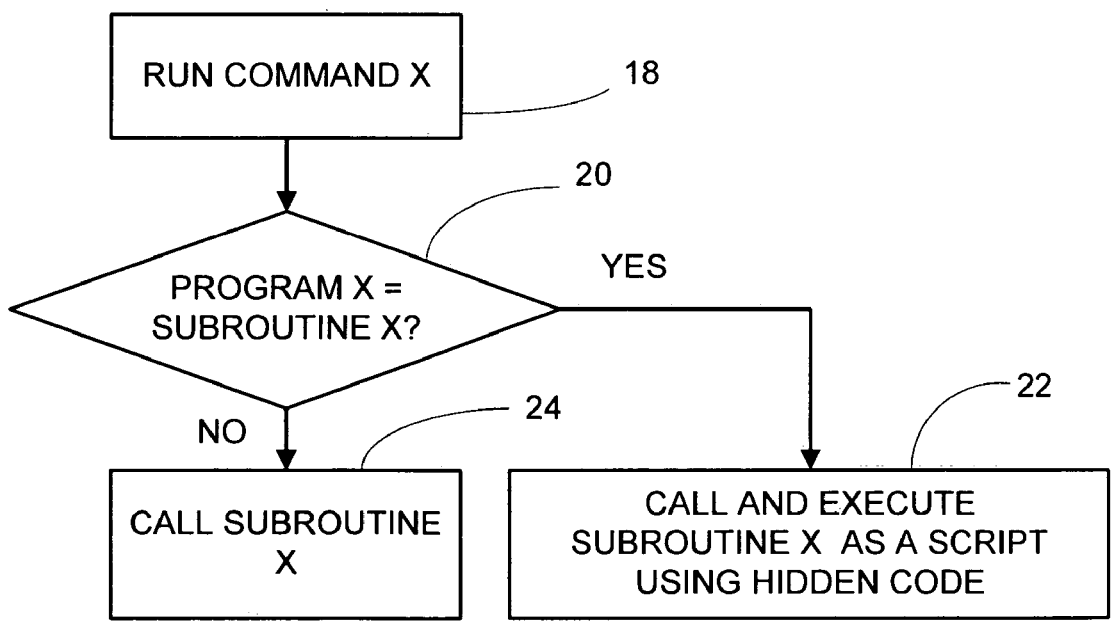
FIG. 2 is a flowchart illustrating the operation of the preferred embodiment of the method of the present invention.

If a run command is inputted from the originating application, the code that runs the subroutine is executed; otherwise the subroutine is merely called. This is shown in FIG. 2, which starts with run command X (block 18) followed by the query: is the program name X the same as subroutine name X (block 20)?. If it is, then the computer calls the subroutine X and runs the hidden code as a script to test the subroutine (block 22). If not, then the subroutine X is called, but not tested (block 24).

For example, if a file named multiply exists, and contains a subroutine called multiply, code that states that if the program name called multiply was that which called the subroutine multiply, using whatever argument script it was called with, then when this is done together with the command multiply, inputs two numbers and prints out the result, because of the specific code that states it is run only if the program name was multiply.

If some other program is being run, it could call the multiply file and have access to the multiply subroutine, but the code that was specific to running it as multiply script does not run, if the other program is not called multiply. It would merely read in the subroutine and not execute it.

That allows a programmer to still use the same code as a library, but also as a standalone as a script. That means that if a change is made to the library, a script is already in place to test it. This enables one to make a change in the library, and if that change required another change, the change in the script can be made and be immediately tested. This eliminates the need to find every script in every other program that accesses that library file to see if it still works.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for creating a computer programming library file containing at least one subroutine for performing a function, the function being used in a non-script programming language or the function being run as a script in a script programming language, comprising the steps of:
   creating a library file having a predetermined given name in a predetermined program file;
   creating at least one subroutine having a name identical to said predetermined name of said library file;
   creating code configured to test the operability of said created at least one subroutine, said code being placed in said library file and being executable only when a name of said predetermined program file matches said name of said created at least one subroutine.

2. A method as defined in claim 1 wherein said test code for determining the operability of said subroutine comprises code providing input data to said subroutine, code for executing said subroutine and code for determining the correctness of the results produced by said subroutine.

3. A method as defined in claim 1 wherein the non-script programming language is a language that must be compiled to produce code that is executable by a computer.

4. A method as defined in claim 1 wherein said script programming language is a language having source code that is directly executable on a computer.

5. A method as defined in claim 1 wherein said computer programming library file is capable of being run by a computer initiating a run command for said given name, said library file:
   calling said created at least one subroutine in the event said run command is run from a program other than said predetermined program file; and
   calling said created at least one subroutine and executing said test code in the event said run command is run from said predetermined program file.

6. A method as defined in claim 1 wherein said predetermined conditions comprise code that examines a run command, determines if it was initiated from said predetermined program file and runs said test code as a script if the examined program file matches said subroutine file name.

7. A method of creating and selectively using a library file having at least one subroutine in a non-script programming language and in a script programming language, comprising the steps of
   creating a library file having a predetermined given name, said library file being produced in a predetermined program file;
   creating the at least one subroutine having a name identical to said predetermined given name of said library file;
   creating code configured to test the operability of said created at least one subroutine, said code being placed in said library file;
   creating code for running said test code under predetermined conditions;
   responsive to a run command being initiated, determining if the run command was initiated from said predetermined program file and running said test code as a script if a program file name matches the created subroutine file name and calling said library file in said non-script language if the program file name fails to match said subroutine file name.

8. A method for creating a first computer programming library file containing at least one subroutine for performing a function, the function being used in a non-script programming language or the function being run as a script in a script programming language, comprising the steps of:
   creating a library file having a predetermined given name and useful in a predetermined program;
   creating the at least one subroutine having a name identical to said predetermined name of said library file;
   creating test code configured to be selectively run as a script to test the operability of said created at least one subroutine, said test code being located in said first library file and being executable only if said created at least one subroutine is called from said predetermined program.

9. A method as defined in claim 8 wherein said test code is not executed when said subroutine file is called from a program other than said predetermined program.

10. A library file stored on a computer-readable medium for execution by a computer, having a predetermined name and at least one subroutine with a name identical to said predetermined name of said library file, that can be used in non-script programs and in multiple script programs wherein the operability of the subroutine can be determined in any program in which it is imported or otherwise used, said library file comprising:
   a subroutine for performing a function in a script program or in a non-script program;
   code hidden in said library file for testing the operability of said subroutine; thereby enabling a programmer to execute the hidden test code to determine the operability of said subroutine in any application in which it is used, the test code being run as a script when a run command is initiated and only when said predetermined name of said library file matches said name of said at least one subroutine.

* * * * *

UNITED STATES PATENT AND TRADEMARK OFFICE
CERTIFICATE OF CORRECTION

| | | |
|---|---|---|
| PATENT NO. | : 7,627,859 B2 | Page 1 of 1 |
| APPLICATION NO. | : 11/098301 | |
| DATED | : December 1, 2009 | |
| INVENTOR(S) | : Matthew P. Potts | |

It is certified that error appears in the above-identified patent and that said Letters Patent is hereby corrected as shown below:

In column 4, line 4, in Claim 7, after "of" insert -- : --.

Signed and Sealed this

Fourth Day of May, 2010

David J. Kappos
*Director of the United States Patent and Trademark Office*